March 14, 1961  W. A. McDOWELL  2,974,635
ANTI-BREEDING DEVICE
Filed Aug. 4, 1958
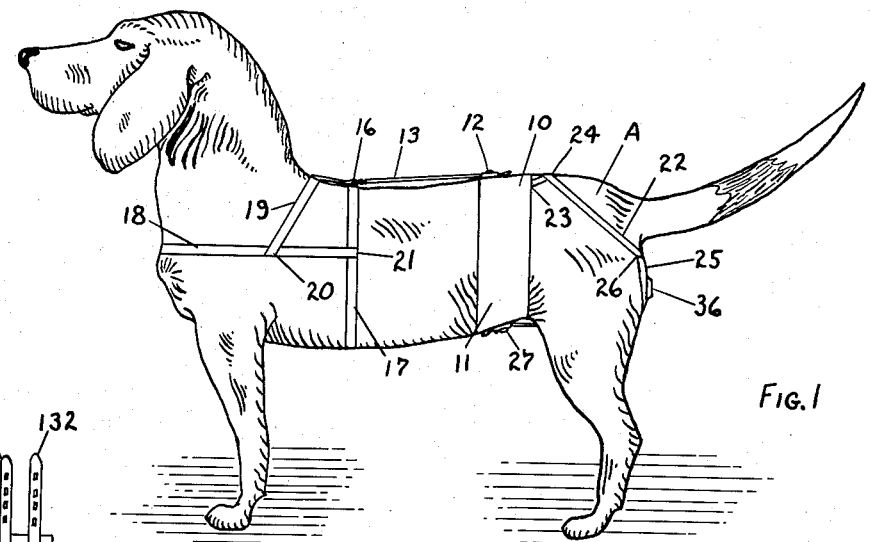
Fig. 1
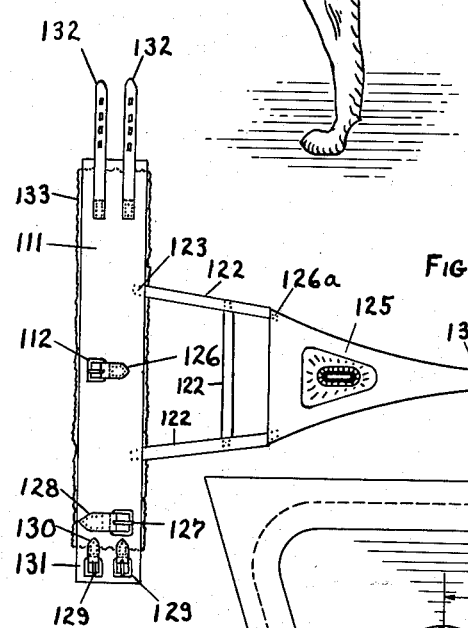
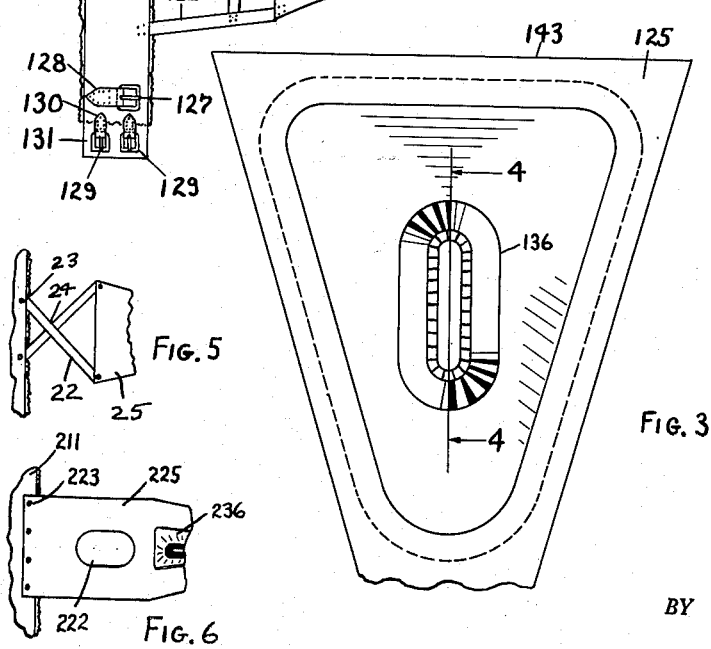
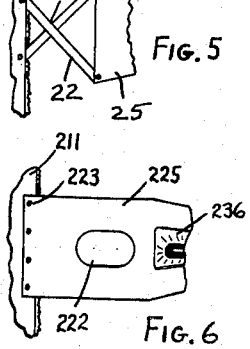
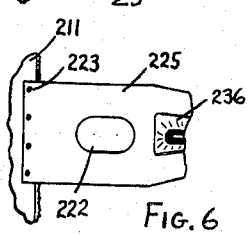
INVENTOR.
WILLIAM A. McDOWELL
BY
Charles L. Lovercheck
atty

United States Patent Office 2,974,635
Patented Mar. 14, 1961

2,974,635

ANTI-BREEDING DEVICE

William A. McDowell, Waterford, Pa.
(2815 N. 52nd St., Phoenix, Ariz.)

Filed Aug. 4, 1958, Ser. No. 752,792

4 Claims. (Cl. 119—143)

This invention relates to a protective device for application to animals and, more particularly, female dogs for protecting them against the liability of unauthorized progeny.

The most important purpose of the protective device is to prevent a female dog from becoming mated during her period of fecundity.

Dog owners and sportsmen experience considerable difficulty during the hunting season and during dog shows because their favorite hunting or show dogs frequently encounter the aforesaid condition at an inopportune time which necessitates keeping the dog confined when it would be extremely desirable to hunt or show the dog. The dog must be confined because of the possibility of her mating with an undesirable specimen. With the protector harness disclosed herein, the dog owner need not be concerned with the possibility of a stray dog mating with his animal during hunting seasons or other times and the dog may run at will with other dogs and may even be kept in the same pen with male dogs at any time while she is wearing the harness disclosed herein.

Protectors have previously been made which support a pad or the like surrounding the organs of an animal. These pads usually completely covered the said organs and, therefore, presented a problem in sanitation when used for extended periods of time. With the device disclosed herein, the dog can perform her normal bodily functions and secretions without interference by the device and, at the same time, she will be completely safe from unauthorized congress with male dogs.

More specifically, it is an object of this invention to overcome the disadvantages in prior protectors of the class described and to provide a safety harness for a dog for the aforementioned purposes.

Another object of the invention is to provide an improved safety harness for a dog.

A further object of the invention is to provide a safety protector for a dog which will prevent other dogs from mating with her and, at the same time, will allow the dog wearing the protector to perform her bodily functions in a normal manner.

A still further object of the invention is to provide a safety harness which is simple in construction and economical to manufacture.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

Fig. 1 is a view of a dog wearing a protector according to the invention;

Fig. 2 is a view of another embodiment of the protector;

Fig. 3 is an enlarged view of the protective member of the device to be attached to a harness;

Fig. 4 is a cross sectional view of the protective member taken on line 4—4 of Fig. 3;

Fig. 5 is a partial top view of the device shown in Fig. 1; and

Fig. 6 is a view of another embodiment of the invention.

Now with more specific reference to the drawing, a dog A is shown having a harness 10. The harness 10 is made up of a body encircling girdle portion 11 which is in the form of a generally elongated and relatively wide strap with a buckle 12 attached to the intermediate portion. The buckle 12 is adapted to receive a strap 13 which is attached at its front portion to a ring 16 on a conventional leash harness. The leash harness is made up of a girth portion 17 and a martingale 18 which encircles the breast of the dog A and is supported by a shoulder band 19 attached at 20 to the martingale portion 18. The martingale 18 is attached to the girth 17 at 21 by riveting, sewing, or the like.

Hip straps 22 are attached at 23 to the girdle 11. The hip straps 22 cross at 24 forwardly of the dog's tail and extend downwardly and are fastened to a shield portion 25 at 26. The shield portion 25 has an outwardly extending flanged portion 36 surrounding an elongated slot therein.

In the embodiment of the invention shown in Fig. 2, a shield 125 is shown similar to the shield 25 in Fig. 1 and hip straps 22 are generally the same as the hip straps 22 in Fig. 1 except the straps 122 do not cross and are attached to a girdle 111 at 123. A buckle 112 serves a similar function to the buckle 12 in Fig. 1 and the buckle 112 is attached by means of a tab 126 which is attached to the girdle 11 by sewing or the like.

A buckle 127 is attached to the girdle 111 by means of a tab 128 or the like. Buckles 129 are attached to a point adjacent the end of the girdle 111 by means of a tab 130. Ends 131 of the girdle 111 extend under straps 132 when the buckles 129 are attached to protect the body of the dog from the buckles 129. The straps 132 are sewn to the other end of the girdle 111 and have spaced holes therein which receive the tongues of the buckles 129 to buckle the girdle 111 snugly around the dog's body. A sheepskin lining 133 is attached to the inner side of the girdle 111 to protect the dog's body from chafing of the girdle 111.

The shield 125 preferably made of leather, plastic, or the like is generally wedge shaped and attached by sewing or riveting to the straps 122 at 126a. The shield 125 tapers to terminate in a strap portion 134 which has spaced holes 135 therein to receive the tongue of the buckle 127. Since the strap portion 134 is of narrow width, it will not chafe the dog's body between the legs when she runs or moves about.

The protector 136 is similar to the portion 36 shown in Fig. 1 and is attached to a strap 125a by rivets 137 which extend through the shield 125 and the protector 136 and through the strap 125a. The harness itself may be made of leather, plastic, or suitable generally pliable material and the protector 136 is preferably made of molded plastic or some other relatively rigid material which is rigid as contrasted to the pliable nature of the harness itself. The protector 136 is generally cup shaped and has a flange 138 extending therearound and conforming to the rear end of the dog's body. The flange 138 is integrally attached to a generally concave portion 139 which has an inner concave surface 140 which terminates in an outlet spout 141 which has an outwardly extending, elongated slot surrounded by an end surface 142. The concave portion 139 is suited to receive the dog's vulva which will normally be enlarged and inflamed during the period aforesaid.

The dog wearing the harness disclosed herein can move about in a normal manner and the position of the protector 136 is such that when the dog squats to urinate, the opening defined by the end surface 142 will move downwardly and be disposed in such position that the urine will completely clear the inside surface of the protector 136 and since the protector 136 is of a hard plastic material, even some urine striking the inside walls of the protector 136 will not necessarily be objectionable.

An upper edge 143 of the shield 125 is spaced downwardly enough that when the dog performs her other bodily function, it will pass above the upper edge 143 and the dog will, therefore, not soil the harness. On the other hand, if a male dog attempts to mate with the female dog, his tender organs will come into contact with the hard elliptical end surface of the protector 136 and his contact with this hard rigid surface will discourage him and cause him to direct his thoughts to other subjects.

In the embodiment of the invention shown in Fig. 6, a dog harness similar to that shown in the other views is disclosed. In this embodiment, a wide strap 225 is attached to a girdle 211 at 223. A tail receiving opening 222 is formed in the strap 225 and a protector 236 is attached to the strap 225. The protector 236 may be structurally the same as the protectors 36 and 136 in the other embodiments.

The foregoing specification sets forth the invention in its preferred practical forms but the structure shown is capable of modification within a range of equivalents without departing from the invention which is to be understood as broadly novel as is commensurate with the appended claims.

The embodiments of the invention in which an exclusive property or privilege is claimed are defined as follows:

1. A dog harness, said harness comprising a body encircling girdle portion and a protector portion attached thereto, said protector portion being adapted to overlie the generative organs of a female dog, said protector portion being generally concave and overlying said generative organs and to receive said organs and terminating outwardly in an elongated, relatively narrow slot communicating through said protector portion, said protector portion having an outwardly extending flange portion attached thereto and surrounding said slot.

2. A dog harness comprising a girdle portion, a protector made of a relatively wide strap rearwardly of said girdle portion, means extending from one end of said protector and attaching to an intermediate point on said girdle portion, said protector having a reduced size portion adapted to extend between the legs of a dog, a buckle on said girdle portion adapted to receive said reduced size portion under the body of a dog, a protector member, said protector member being disposed in an opening at an intermediate portion of said protector, said protector member being concave on the side thereof adapted to be adjacent the dog's body made of relatively rigid material and having a relatively narrow elongated slot extending through said concave side and extending from the upper end of said concave side to the lower part of said concave side therein to overlie the organs of said dog, and a flange portion extending outwardly and surrounding said slot.

3. A dog harness comprising a girdle member, a buckle attached at an intermediate portion of said girdle member, spaced adjusting straps attached to one end of said girdle member, two spaced crossed straps attached to an intermediate portion of said girdle member and extending rearwardly therefrom, the rear ends of said straps being attached to a relatively wide protector, said protector tapering to a narrow portion adapted to extend between the legs of a dog, means attaching a portion of said girdle member to said protector below the body of said body, an elongated slot in the intermediate portion of said protector, a protector member disposed in said girdle member, said protector member having an opening therethrough, and a flange made of relatively rigid material surrounding said opening and extending rearwardly therefrom.

4. A device of the class described comprising a girdle, a protector, said girdle adapted to extend around the body of an animal, said protector comprising a flat flexible member adapted to engage the rear end of the animal and extending between the animal's rear legs and attached to said girdle below the body, means to attach the upper end of said protector to said girdle, and an elongated slot in said protector adapted to overlie the vulva of the animal, said protector being in the shape of a concave portion surrounding said slot to receive said animal's vulva, and a rearwardly extending flange attached to said protector and surrounding said slot.

References Cited in the file of this patent

FOREIGN PATENTS

| | | |
|---|---|---|
| 577,401 | France | June 4, 1924 |
| 683,622 | France | June 16, 1930 |
| 197,423 | Switzerland | Apr. 30, 1938 |